United States Patent
Anderson

[11] 3,864,965
[45] Feb. 11, 1975

[54] D. C. DYNAMOMETER SPEED CONTROL CIRCUIT

[75] Inventor: Harold E. Anderson, Los Angeles, Calif.

[73] Assignee: McCulloch Corporation, Los Angeles, Calif.

[22] Filed: Feb. 5, 1973

[21] Appl. No.: 329,398

[52] U.S. Cl. .................................. 73/134, 318/154
[51] Int. Cl. .............................................. G01l 3/22
[58] Field of Search ....... 73/134, 117; 318/153, 154

[56] References Cited
UNITED STATES PATENTS

| | | | |
|---|---|---|---|
| 2,498,281 | 2/1950 | Kovalsky | 318/154 X |
| 2,641,735 | 6/1953 | Elliot | 318/154 X |
| 2,785,367 | 3/1957 | Roman et al. | 73/134 X |
| 2,929,243 | 3/1960 | Slamar | 73/134 |
| 2,982,128 | 5/1961 | Gibson et al. | 73/134 X |
| 3,022,453 | 2/1962 | Jones | 318/154 |
| 3,192,482 | 6/1965 | Long | 318/154 X |

*Primary Examiner*—Charles A. Ruehl
*Attorney, Agent, or Firm*—Burns, Doane, Swecker & Mathis

[57] ABSTRACT

A direct current dynamometer speed control circuit including transistors connected in series with the dynamometer field coil and the generator field coil for controlling the current in the field coils in a continuously variable manner to effect smooth mode changes between an absorbing mode and a motoring mode responsively to dynamometer speed changes. The desired speed of the dynamometer is established by a preset d.c. potential onto which is impressed a rectified tachometer signal having an amplitude related to the speed of the dynamometer input/output shaft. Control voltages for the transistors are applied through Zener diodes which function as threshold circuits for applying full current to the generator field coil and/or reducing the dynamometer field coil current for large drops in dynamometer speed. A circuit is provided for preventing the dynamometer field from dropping below a predetermined value for preventing dynamometer runaway. A novel current sharing transistor circuit is also disclosed.

12 Claims, 3 Drawing Figures

PATENTED FEB 11 1975    3,864,965

D. C. DYNAMOMETER SPEED CONTROL CIRCUIT

BACKGROUND OF THE INVENTION

This invention relates to direct current dynamometers and more particularly to a method and apparatus for increasing the sensitivity of direct current dynamometers to input/output shaft speed changes.

Direct current dynamometers, such as the Ward-Leonard type dynamometers, are well known in the art. The Ward-Leonard system is an open loop system which generally includes a direct current dynamometer mounted in a cradle with an input/output shaft for either driving or loading an engine to be tested. The dynamometer may be operated as a motor for driving the engine to be tested, or in an alternative mode of operation, operated as a generator for the purpose of loading the engine when the engine is started and is operated under its own power.

In either mode, the dynamometer must be brought up to a desired speed. The desired speed is maintained so that measurements of torque and the like can be monitored by cradle displacement. Depending on the type of measurement the dynamometer must either act as a motor or act as a generator in order to maintain the constant desired speed.

A persisting problem with control circuits for dynamometers is the sensitivity of the control circuits to changes in speed of the input/output shaft above and below the desired speed. More particularly, it is desirable to engender a mode change between an absorbing or braking mode (i.e., when the dynamometer functions as a generator) and a motoring mode, or vice versa, for very small changes in the input/output shaft speed above and below the desired speed. It is also important that the control system not respond to various harmonics of the desired speed such that a false desired speed is set by the harmonic response of the control circuit.

For instance, control systems utilizing silicon controlled rectifiers (SCR's), thyratrons and the like, which operate to control generator and dynamometer fields by varying the duty cycle of the current delivered to appropriate field coils, are generally relatively insensitive to small changes in the speed of the dynamometer input/output shaft. Insensitivity occurs because SCR's or thyratrons periodically switch current to appropriate field coils and are nonresponsive during a portion of each cycle of the a.c. source. The nonresponsive time period is a function of the frequency of the a.c. source utilized, the instantaneous duty cycle, and the firing thresholds of the SCR's or thyratrons. Because of these firing thresholds the period of the periodic switching of current to the field coils cannot be reduced below predetermined values. SCR and thyratron switching thresholds may thus require a large change in dynamometer speed for firing and resulting circuit mode change. SCR controlled circuits are also subject to harmonic instabilities and cross firing. Because of the overcommittal or hysteresis inherent in these circuits, as much as a 300 rpm speed change is oftentimes necessary for these circuits to cross over from a braking or absorbing mode to a motoring mode.

Moreover, systems which function in a discontinuous or switching mode to switch predetermined voltages across the dynamometer field coil or the generator field coil are also generally insensitive to speed changes of, for instance, 5 to 6 rpm and, in general, suffer from switching transients.

In another type prior art control system, dynamometer fields are energized in a pulse control mode, with the number of pulses delivered over a given period of time controlling the energization of the coils and therefore of the mode of operation of the dynamometer. It will be appreciated that pulse control systems require complicated circuitry and complex systems for setting the desired speed of the dynamometer.

In addition to the problems noted hereinbefore, motor runaway is sometimes permitted by the control systems of the prior art.

It is accordingly an object of this invention to obviate the deficiencies of the prior art by providing a novel method and speed control circuit for a direct current dynamometer in which the currents in the generator field coil and in the dynamometer field coil are controlled in a continuously variable mode once the dynamometer has reached a desired speed.

It is another object of this invention to provide a novel method and circuit for controlling current in the field coils of a direct current dynamometer by controlling the conductivity of the energization paths to one or more of the coils.

It is yet another object of this invention to provide a novel method and control circuit for a direct current dynamometer for smoothing the cross-over transition between an absorbing and motoring mode such that mode changes may occur responsively to small changes in the speed of the dynamometer input/output shaft.

It is still another object of this invention to provide a novel and improved method and control circuit in which transistors are utilized in the control circuit for the dynamometer and generator field coils to reduce the speed change necessary to cause a mode change in the operation of the dynamometer.

It is a further object of this invention to provide a novel method and system for controlling the speed of a direct current dynamometer in which the desired speed of the dynamometer is controlled by a regulated d.c. signal combined with a d.c. control signal having an amplitude related to the speed of the dynamometer.

It is a still further object of this invention to provide a novel method and circuit for controlling the speed of a direct current dynamometer in which the energization of the field coils controlling the speed of the dynamometer is under the control of threshold circuits for rapidly raising the speed of the dynamometer responsively to large speed drops, and which is controlled in a continuously variable manner for smaller changes in speed about a desired speed.

The utilization of multiple transistors in parallel to share the current requirements is well known. Because of thermal runaway problems, the transistors of known circuits must be carefully matched and mounted on a common heat sink.

It is another object to provide a novel transistor current sharing circuit which eliminates the need for matched transistors and a common heat sink.

These and other objects of the invention will be readily apparent to one skilled in the art to which the invention pertains from the claims and from the following detailed description when read in conjunction with the appended drawings.

DETAILED DESCRIPTION

Figure 1:
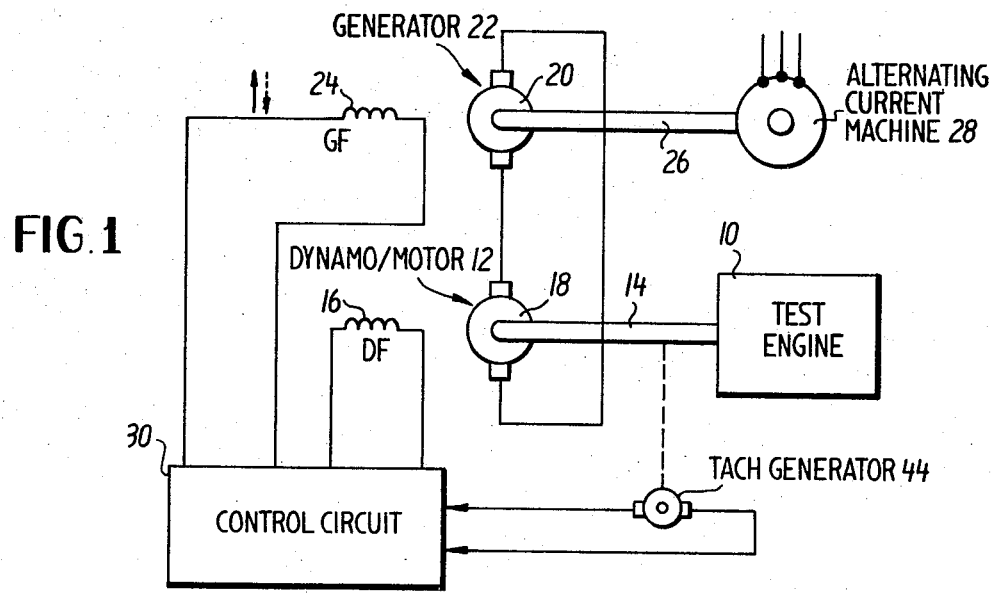
FIG. 1 is a schematic diagram in block form of a direct current dynamometer of the present invention.

Referring now to FIG. 1, a direct current dynamometer for use in conjunction with a test engine 10 may include a direct current motor or dynamometer 12 having an input/output shaft 14 connected to the test engine 10. As is conventional, the dynamometer 12 is provided with a dynamometer field (DF) coil 16 and an armature 18.

The armature 18 of the dynamometer 12 may be connected in series to the armature 20 of a generator 22 which is provided with a generator field (GF) coil 24. The armature 20 of the generator 22 may be driven by a shaft 26 from an alternating current machine 28 powered from a conventional three-phase power line. The speed of the dynamometer 12 may be maintained constant by control of the current through the coils 16 and 24, with current control being provided by a control circuit 30 responsively to the speed of the input/output shaft 14. The speed of the shaft 14 may be sensed by a tachometer-generator or alternator 44 coupled to the shaft 14 for generating a signal having an amplitude proportional to the speed of the shaft 14. In one embodiment, the tachometer-generator 44 may deliver 25v/1,000 rpm.

In operation and with continued reference to FIG. 1, when the dynamometer 12 is to be brought up to a predetermined speed, maximum current may be initially applied to the dynamometer field coil 16 via the circuit 30. A gradually increasing current may then be applied to the generator field coil 24 until the armature 18 reaches a predetermined speed. The speed of the armature 18 may be increased by increasing the current through the generator field coil 24 until the maximum current is reached. Thereafter, the speed of the armature 18 may be further increased by reduction of the current in the dynamometer field coil 16. As will be described hereinafter, it is undesirable to decrease the current in the dynamometer field coil 16 to zero. A decrease to zero which removes all of the dynamometer field will result in dynamometer runaway.

After the armature 18 and the input/output shaft 14 attain a predetermined speed, the speed may be maintained constant with respect to loading by the test engine 10 or torque delivered by the test engine 10 by controlling the currents applied to the generator field coil 24 below base speed and the dynamometer field coil 16 above base speed. It will be appreciated that when the dynamometer functions as a motor to drive the engine 10 as the speed of the input/output shaft is increased, an increased load will be placed on the dynamometer 12 due to engine friction. This increased load is transmitted by the shaft 14 to the armature 18 to slow down the dynamometer 12. When operating above base speed, the dynamometer field may be decreased to make the dynamometer act as a motor to increase dynamometer speed and thereby to maintain the predetermined speed. Alternatively, when operating below base speed, the generator field may be increased by increasing current to the generator field coil 24 for increasing dynamometer speed. The field changes are not made simultaneously as the armature current increase is unacceptable. Below base speed the dynamometer field is maximized and the generator field raised for an increase in speed. Above base speed the generator field is maximized and the dynamometer field decreased to achieve a speed increase.

The test engine 10 may be energized for applying torque to the input/output shaft 14 to cause the armature 18 to rotate faster than the desired speed. To counteract the increase in speed of the armature 18, the current in the dynamometer field coil 16 may be increased, or the current in the generator field coil 24 decreased, depending on the speed of the dynamometer relative to base speed. It will be appreciated that in this mode of operation the dynamometer 12 functions as a generator to load the motor 10 with the generator 22 functioning as a motor for driving the alternating current machine 28 which in turn applies an a.c. potential to the alternating current carrying buses thereto.

Figure 2:
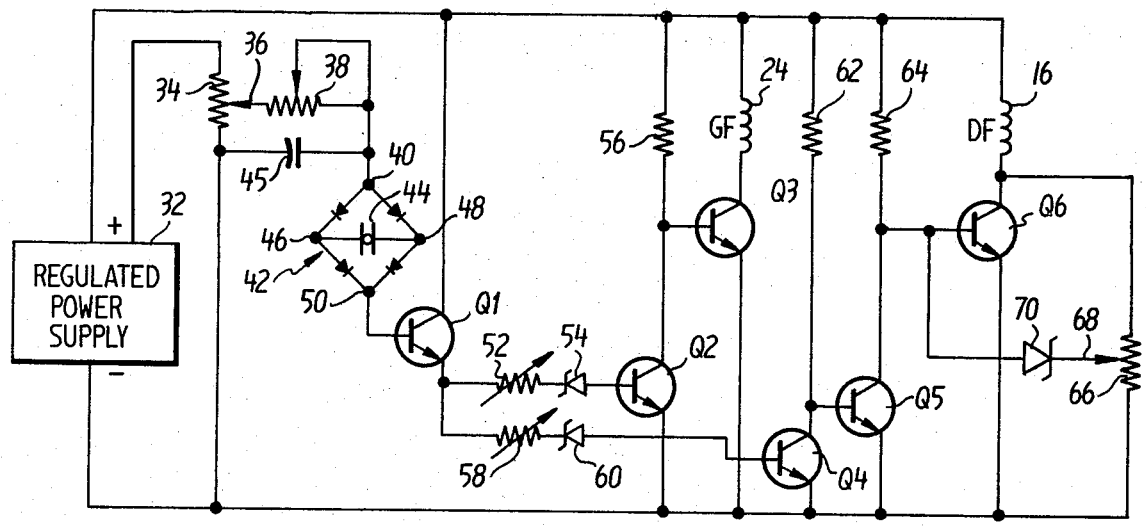
FIG. 2 is a schematic diagram of a control circuit for the direct current dynamometer of FIG. 1; and, FIG. 3 is a schematic diagram of a transistorized current control circuit which may be substituted for selected transistors of the circuit of FIG. 2.

A control circuit for effecting mode change, i.e., from braking to motoring or vice versa, as close as 5 rpm of the desired speed and within the torque carrying ability of the dynamometer, is illustrated in FIG. 2. With reference to FIG. 2, the control circuit may include a regulated d.c. power supply 32 having a positive and negative side and delivering a regulated voltage of 220 volts. A potentiometer 34 may be connected across the regulated power supply 32 and may include a wiper arm 36 for tapping off a predetermined regulated voltage. The wiper arm 36 may be connected through a second potentiometer 38 to a terminal 40 of a diode rectifying bridge circuit 42 and a smoothing capacitor 45 may be connected between the terminal 40 and the negative side of the regulated power supply. The tachometer-generator or alternator 44 of FIG. 1 may be connected so as to apply an a.c. output therefrom across terminals 46 and 48 of the diode bridge circuit 42.

The output terminal 50 of the diode bridge circuit 42 may be connected to the base electrode of an NPN transistor $Q_1$. The collector electrode of the transistor $Q_1$ may be connected to the positive side of the regulated power supply 32 and the emitter electrode thereof connected through a potentiometer 52 and a Zener diode 54 to the base electrode of a second NPN transistor $Q_2$. In one embodiment the Zener diode 54 may be provided with a reverse bias breakdown potential of 180 volts. The collector electrode of the transistor $Q_2$ may be connected to the positive side of the regulated power supply 32 through a resistor 56 and also to the base electrode of a third NPN transistor $Q_3$, with the emitter electrode of the transistor $Q_2$ being connected to the negative side of the regulated power supply 32. The collector electrode of the transistor $Q_3$ may be connected to the positive side of the regulated power supply 32 through the afore-mentioned generator field coil 24 and the emitter electrode thereof connected to the negative side of the regulated power supply 32.

The emitter electrode of the transistor $Q_1$ may also be connected through a potentiometer 58 and a Zener diode 60 to the base electrode of a fourth NPN transistor $Q_4$ having the emitter electrode thereof connected to the negative side of the regulated power supply 32 and the collector electrode thereof connected to the positive side of the regulated power supply 32 through a resistor 62. The Zener diode 60 may be provided with a reverse bias breakdown potential slightly lower than that of the Zener diode 54, for instance, 170 volts. The collector electrode of the transistor $Q_4$ may be connected to the base electrode of a fifth NPN transistor $Q_5$ having the emitter and collector electrodes thereof connected respectively to the negative side of the regulated power supply 32 and through a resistor 64 to the positive side of the regulated power supply 32. The collector electrode of the transistor $Q_5$ may also be connected to the base electrode of a sixth NPN transistor $Q_6$ having the emitter electrode thereof connected to the negative side of the regulated power supply 32 and the collector electrode thereof connected to the positive side of the regulated power supply 32 through the aforementioned dynamometer field coil 16. A potentiometer 66 may be connected between the collector and emitter electrodes of the transistor $Q_6$ with a wiper arm 68 thereof connected through a Zener diode 70 to the base electrode of the transistor $Q_6$.

The desired speed at which the dynamometer 12 will operate may be selected by the positioning of the wiper arm 36 of the potentiometer 34 and the positioning of the wiper arm of the potentiometer 38. The potentiometer 38 and the capacitor 45 together serve to damp the speed control effected by the potentiometer 34.

To initiate motoring, the wiper arm 36 may be positioned so that a positve voltage is available thereat which is high enough to overcome the voltage drop across the potentiometer 38, the diode bridge circuit 42, the transistor $Q_1$, the potentiometer 52, and the reverse bias breakdown potential of the Zener diode 54 to render the transistor $Q_2$ sufficiently conductive so that current therethrough lowers the potential at the base electrode of the transistor $Q_3$ enough to drive the transistor $Q_3$ into cutoff. Under these conditions no current flows through the generator field coil 24.

The potential at the emitter electrode of the transistor $Q_1$ may also be applied through the potentiometer 58 and the Zener diode 60 to the base electrode of the transistor $Q_4$ to render the transistor $Q_4$ conductive, thereby lowering the potential at the base electrode of the transistor $Q_5$ sufficiently to drive the transistor $Q_5$ into cutoff. Upon cutoff of the transistor $Q_5$, the potential at the base of the transistor $Q_6$ may be raised sufficiently to turn the transistor $Q_6$ on, thereby supplying maximum current to the dynamometer field coil 16. This is the "start" condition in which dynamometer motoring is initially prevented.

The dynamometer 12 may be caused to motor by gradually reducing the potential available at the wiper arm 36 in such a manner that the conduction of the transistor $Q_2$ is reduced. The reduced current through the transistor $Q_2$ increases the potential applied to the base electrode of the transistor $Q_3$, thereby supplying current through the generator field coil 24. The wiper arm 36 should be moved slowly towards the negative side of the regulated power supply so that the transistor $Q_4$ is maintained conductive. Thus, a maximum field current will be maintained across the dynamometer field coil 16.

With maximum dynamometer field current and some generator field current the dynamometer will begin to motor and will gain speed until limited by the potential generated by the tachometer-generator 44. Dynamometer speed is limited when the tachometer generated potential added to the potential available at the wiper arm 36 renders the transistor $Q_2$ more conductive to reduce generator field current. After a period of time the speed of the dynamometer 12 will become stabilized.

After stabilization, the speed of the dynamometer 12 may be raised by lowering the potential available at the wiper arm 36 until such time as there exists a maximum generator field and a maximum dynamometer field. At this point further reduction of the potential available at the wiper arm 36 has no effect on the conduction of the transistor $Q_2$. However, the potential at the wiper arm 36 may be reduced enough to drive the transistor $Q_4$ into cutoff. When the transistor $Q_4$ is driven into cutoff, the transistor $Q_5$ may be rendered conductive to reduce the base electrode bias of the transistor $Q_6$. This reduces the current through the transistor $Q_6$ and thus through the dynamometer field coil 16 to cause the dynamometer to increase speed until the tachometer generated potential effects sufficient conduction of the transistor $Q_4$ to increase the dynamometer field current.

As mentioned hereinbefore, it is not desirable to reduce the dynamometer field current to zero. The Zener diode 70, in combination with the potentiometer 66, prevents the potential applied to the base electrode of the transistor $Q_6$ from dropping below a potential set by the wiper arm 68 of the potentiometer 66. This insures the conduction of the transistor $Q_6$ and thus prevents the reduction of the dynamometer field current to zero. In the preferred embodiment the wiper arm 68 of the potentiometer 66 is set such that the current in the dynamometer field coil 16 never drops below one quarter of the maximum dynamometer field current.

Once the desired speed of the dynamometer is set, increases or decreases about this desired speed are transmitted to the circuit of FIG. 2 by the potential applied to the terminals 46 and 48 of the diode rectifying bridge 42. If the test engine 10 of FIG. 1 applies additional torque to the input/output shaft 14, the a.c. voltage generated by the tachometer-generator 44 may be rectified and combined or superimposed on the potential available at the wiper arm 36. This potential may be used to control the conduction of the transistors $Q_3$ and $Q_6$ such that the generator field current through the generator field coil 24 may be reduced. Above base speed the dynamometer field current through the dynamometer field coil 16 may be increased in a continuously variable manner.

Likewise, when the shaft 14 speed falls below the desired speed the falling potential at the output terminal 50 of the diode bridge circuit 42 may reduce the conduction of the transistor $Q_2$ thereby increasing the conduction of the transistor $Q_3$ to increase the current to the generator field coil 24. Above base speed the conduction of the transistor $Q_4$ may be reduced to increase the conduction of the transistor $Q_5$ which decreases the conduction of the transistor $Q_6$ to decrease the amount of current available to the dynamometer field coil 16.

As can be seen, once the dynamometer 12 has reached the desired speed, small changes in speed are corrected in a continuously variable manner by adjustment of the conductivity of the transistor $Q_3$ below base speed and the adjustment of the conductivity of the transistor $Q_6$ above base speed.

Should the dynamometer speed drop drastically, such that the control potential at the cathodes of the Zener diodes 54 and 60 is below the reverse breakdown potentials thereof maximum current may be applied to the generator field and the dynamometer field may be reduced to the minimum set by the wiper arm 68. Because of the difference between the reverse bias breakdown voltages of the Zener diodes, the generator field is maximized before the dynamometer field is reduced at speeds above base speed. This provides a safety factor in that the action of the dynamometer field coil is not immediately removed. Thus, the control circuit operates in a continuously variable manner for normal changes about the desired speed while acting to switch the circuit for maximum dynamometer acceleration during large speed drops.

In summary, when the potential at the cathode electrodes of the Zener diodes 54 and 60 is sufficiently high to cause a reverse bias breakdown of the diodes, the circuit operates in a continuously variable manner. These diodes therefore set a predetermined threshold for switching to maximum motoring should the voltage applied to the cathode electrodes thereto drop below the predetermined threshold. This increases the speed of the input/output shaft 14 until such time as enough potential is applied between the terminal 46 and 48 of the diode bridge circuit 42 to again cause the control circuit to operate in a continuously variable mode.

Figure 3:
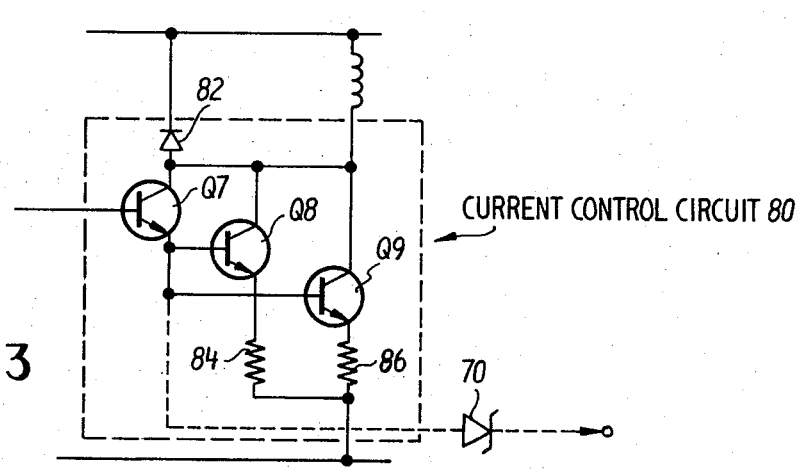

Referring now to FIG. 3, a current control circuit 80 may be substituted for either the transistors $Q_3$ or $Q_6$ in the circuit of FIG. 2. The control circuit 80 may include a transistor $Q_7$ having a collector electrode adapted to be coupled through a diode 82 to the positive side of the regulated power supply 32 of FIG. 2. The base electrode of the transistor $Q_7$ is adapted to be connected to the collector electrode of either the transistor $Q_2$ or the transistor $Q_5$ of FIG. 2. The emitter electrode of the transistor $Q_7$ may be connected in parallel to the base electrodes of transistors $Q_8$ and $Q_9$, with the collector electrodes of the transistors $Q_7$ through $Q_9$ being interconnected and adapted to be connected through one of the field coils of FIG. 2 to the positive side of the afore-mentioned regulated power supply 32. The emitter electrodes of the transistors $Q_8$ and $Q_9$ are adapted to be connected respectively through resistors 84 and 86 to the negative side of the regulated power supply 32 of FIG. 2.

The parallel connection of the transistors $Q_8$ and $Q_9$ increases the current handling capability of the control circuit 80 over the transistors $Q_3$ and $Q_6$ of FIG. 2. As such, the current control circuit 80 may be substituted for the transistors $Q_3$ and $Q_6$ of FIG. 2 when it is desirable to handle increased currents through either of the field coils 16 or 24. The necessity for and expense of large current handling devices such as SCRs is thus eliminated.

As is well known, the base-to-emitter electrode voltage of a transistor decreases with an increase in heat. With a common potential at the base electrodes of the transistors $Q_7$, $Q_8$ and $Q_9$, any unmatch in the transistors or variation in the temperature thereof will tend to produce thermal runaway. However, the utilization of the resistors 84 and 86 respectively in the emitter circuits of the transistors $Q_8$ and $Q_9$ prevent runaway by back biasing the emitter electrode as the voltage drop across the resistor increases with an increase in current. It is thus possible to divide the current among several transistors without elaborate matching of the transistors and the heat sink associated therewith.

ADVANTAGES AND SCOPE OF THE INVENTION

From the foregoing description, it will be appreciated that the transistorized control of the currents through the generator and dynamometer field coils increases the sensitivity of the control circuit to small changes in the speed of the dynamometer above and below a base speed with respect to circuits utilizing silicon controlled rectifiers, thyratrons and the like. The ability to sense small changes in the speed of the dynamometer permits increasingly accurate torque measurements to be made. Because transistors are available with a response of one megahertz or better, hunting in the subject system is minimal and harmonic instabilities are virtually eliminated.

It will also be appreciated that the threshold circuits have been provided for accelerating the direct current dynamometer in the event of large speed drops, in which the circuit changes from a continually variable mode of operation to a discontinuous mode of operation for rapidly accelerating the direct current dynamometer. The control circuit described also provides for an accurate method of setting the desired speed of the dynamometer and provides circuitry which prevents dynamometer runaway.

The subject control provides for continuously variable control of the currents in the dynamometer and generator field coils such that the currents are adjusted above and below base speed in opposite directions for sensed speed changes. By appropriate adjustment of the potentiometers 52 and 58, control of the dynamometer by controlling the current in only one of the field coils may be achieved. Additionally, the potentiometers utilized set the sensitivity of the circuit to speed changes.

The necessity for extremely close tolerances in the transistors of a current sharing circuit has been obviated as has the need for an elaborate common heat sink by the utilization of resistors in the emitter circuits of the parallel transistors.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A dynamic speed control system for a direct current dynamometer including dynamometer means having a dynamometer field coil and generator means having a generator field coil, the dynamometer and generator means having armatures connected in series, and the dynamometer having an input/output shaft adapted for connection to an engine under test, comprising:
tachometer means for generating a signal having an amplitude related to the speed of the input/output shaft of the dynamometer; and,
means for controlling the current in the dynamometer and generator field coils responsively to the amplitude of said tachometer signal to maintain the rotational speed of the input/output shaft constant, said current controlling means including transistor means continuously variable in the degree of conduction and operably coupled to said tachometer signal for varying the current to the coils to thereby vary the operation of the dynamometer between motoring and braking modes in response to small changes in the speed of the input/output shaft, said transistor means including a first transistor means for controlling the current in the generator field coil, a second transistor means for controlling the current in the dynamometer field coil, and means for reducing the conduction of one of said transistor means and increasing the conduction of the other of said transistor means responsively to a change in said tachometer signal, the degree of conduction of each of said transitor means being independent of the degree of conduction of the other of said transistor means.

2. The system of claim 1 wherein the current through said transistor means is continuously variable above a first predetermined value, and wherein said means for increasing and reducing said transistor means conductivity includes means for rendering said first transistor means fully conductive responsively to the reduction of said tachometer signal below a second predetermined value related to said first predetermined value.

3. The system of claim 2 wherein said means for rendering said first transistor means fully conductive includes means for interrupting said tachometer signal responsively to a reduction thereof below said second predetermined value; and, means for applying a potential to the base electrode of said first transistor means sufficient to bias said first transistor means into full conduction responsively to the interruption of the application of said tachometer signal.

4. The system of claim 3 further including means for applying a potential sufficient to reduce the conduction of said second transistor means to a predetermined level responsively to the interruption of said tachometer signal.

5. The system of claim 2 wherein said first and second transistor means each include a plurality of transistors, the base and collector electrodes of said transistors being connected together and the emitter electrodes of each of said transistors being connected through an impedance element to a common point.

6. The system of claim 1 including means for limiting the bias of said second transistor to a predetermined value insuring the conduction thereof and thus the passage of current through the dynamometer field coil.

7. A dynamic speed control for a direct current dynamometer having a generator field coil and a dynamometer field coil comprising:

means for generating a d.c. signal having an amplitude related to the speed of the dynamometer; and, continuously variable current control means including transistor means for continuously varying the current through the coils responsively to the amplitude of said d.c. signal to thereby control the speed of the dynamometer responsively to variation in the speed of the dynamometer above and below a predetermined base speed, said current control means including:

a first transistor for controlling the current in the generator field coil;

a second transistor for controlling the current in the dynamometer field coil; and, means for reducing the conduction of one of said transistors and increasing the conduction of the other of said transistors responsively to a change in said control potential.

8. The speed control of claim 7 wherein said means for generating a d.c. signal includes:

means for generating a d.c. signal having a predetermined amplitude;

means for generating a d.c. signal having an amplitude variable in response to dynamometer speed;

means for combining said d.c. signals to produce a control potential; and, means for applying said control potential to said transistor means to control the amount of current in said coils.

9. The speed control of claim 7 wherein said means for increasing and reducing conductivity includes means for rendering said first transistor fully conductive responsively to a reduction in said control potential below a predetermined value.

10. The speed control of claim 9 wherein said means for rendering said first transistor fully conductive includes means for interrupting the application of said control potential to said transistors and means for applying a potential to the base electrode of said first transistor sufficient to bias said first transistor into full conduction responsively to said control potential application interrupting means.

11. The speed control of claim 7 wherein said means for increasing and reducing transistor conductivity includes means for rendering said first transistor fully conductive responsively to a reduction in said d.c. signal below a predetermined value.

12. The system of claim 7 wherein said transistors include a plurality of transistors, the base and collector electrodes of said transistors being connected together and the emitter electrodes of each of said transistors being connected through an impedance element to a common point.

* * * * *